Nov. 18, 1941.           R. A. GOEPFRICH           2,262,844
                              BRAKE
                    Filed March 19, 1938
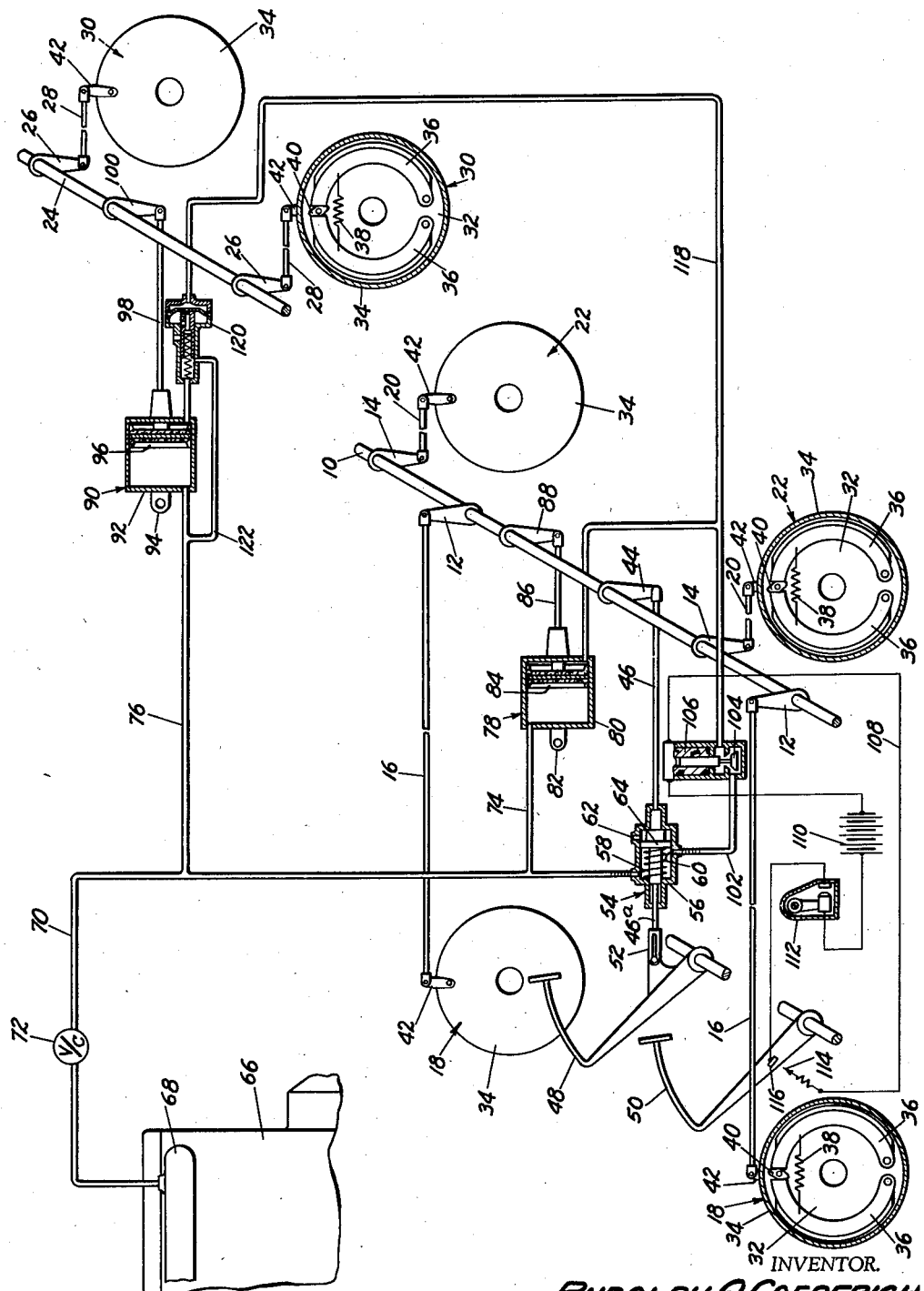
INVENTOR.
Rudolph A. Goepfrich
BY Jerome R. Cox
                    ATTORNEY.

Patented Nov. 18, 1941

2,262,844

UNITED STATES PATENT OFFICE 2,262,844

BRAKE

Rudolph A. Goepfrich, South Bend, Ind., assignor to Bendix Products Corporation, South Bend, Ind., a corporation of Indiana Application March 19, 1938, Serial No. 196,815

8 Claims. (Cl. 188—152)

This invention relates to braking systems for motor vehicles.

An object of the invention is to provide a vacuum power operated braking system having means for maintaining the brakes in applied position.

Another object of the invention is to provide a vacuum power operated braking system for a tractor and a trailer having means connected in the system, operative substantially simultaneously with a braking operation, when the tractor and the trailer are ascending an incline, to retain the brakes in applied position.

Other objects of the invention will appear from the following description taken in connection with the drawing forming a part of this specification, and in which the drawing is a comprehensive view, largely in diagram and partly in section, illustrating a braking system embodying the invention.

Referring to the drawing, 10 represents a rockable cross-shaft having thereon two pairs of arms 12 and 14, one pair connected as by rods 16 to brakes 18 associated with the front wheels of a vehicle, and the other pair connected as by rods 20 to brakes 22 associated with the rear wheels of the vehicle. Correspondingly, a cross-shaft 24 rockable on the frame of a trailer, normally coupled to the vehicle, has thereon a pair of arms 26 connected as by rods 28 to brakes 30 associated with the rear wheels of the trailer.

The brakes may be of any preferred type. As shown, each of the brakes includes a fixed support or backing plate 32 adapted to be secured to an axle or to an axle housing, a drum 34 associated with the backing plate and adapted to be secured to a wheel, a pair of corresponding friction elements or shoes 36 pivoted on the backing plate, a retractile spring 38 connecting the shoes, and a cam 40 mounted on the backing plate between the shoes and connected through an operating lever 42 to a conventional tension rod.

The rockable shaft 10 has thereon an arm 44 connected as by a rod 46, a valve 54, and a rod 46a to a brake pedal lever 48 associated with a clutch pedal lever 50. The rod 46a is connected to the brake pedal lever 48 by a connection 52, and interposed in the connection between arm 44 of shaft 10 and the brake pedal lever 48 is a control valve 54 including a cylinder 56 having spaced ports 58 and 60, an opening 62 for venting the cylinder to the atmosphere, and a piston 64 in the cylinder.

An internal combustion engine 66 of conventional type has an intake manifold connected to the port 58 of the valve housing 56 by a conduit 70 having interposed therein a cutout valve 72, and provided intermediate the control valves 54 and 72 with branch conduits 74 and 76. The portion of the conduit 70 adjacent to the valve 56 is flexible so that the valve may move with the rod 46 and 46a. The branch conduit 74 is connected to a vacuum power motor 78 including a cylinder 80 pivotally supported as at 82, and a piston 84 reciprocable in the cylinder and connected as by a rod 86 to an arm 88 on the shaft 10. Correspondingly, the branch conduit 76 is connected to a vacuum power motor 90 including a cylinder 92, pivotally supported as at 94, and a piston 96 reciprocable in the cylinder and connected as by a rod 98 to an arm 100 on the cross-shaft 24.

The port 60 in the cylinder 56 of the control valve 54 is connected by a conduit 102 to the cylinder 80 of the vacuum power motor 78 back of the piston therein, and interposed in the conduit 102 is an electrically controlled valve 104 preferably actuated by a solenoid 106 connected in an electrical circuit 108 including a battery 110, a gravity switch 112, and a make-and-break for the circuit consisting of a contact 114 arranged for cooperation with a contactor 116 carried on the clutch pedal lever 50. The portion of the conduit 102 adjacent to valve 56 is flexible so that the valve may be moved as stated above.

The conduit 102 has a branch 118, intermediate the electrically controlled valve 104 and the vacuum power motor 78, connected through a relay valve 120 to the cylinder 92 of the vacuum power motor 90 back of the piston 96, and the relay valve is connected by a conduit 122 to the conduit 76 so as to by-pass the vacuum power motor 90.

In operation, assuming that the system is at rest with the brakes of the tractor and the trailer in the off or retracted position and that the engine is operating under normal load of the tractor and trailer in motion, under these conditions, suction created in the manifold of the engine is distributed through the piping system to the vacuum operated motors 78 and 90 so as to maintain the pistons of the motors suspended in vacuum.

When the tractor and trailer are ascending an incline and it is desired to stop, the operator depresses the brake pedal lever 48 to apply the brakes, and substantially simultaneously therewith the operator also depresses the clutch pedal lever 50 to release the clutch. During the initial movement of the brake pedal lever 48, the control valve 54 is actuated to shut off communication between the conduit 70 and the conduit 102 and to open the conduit 102 to the atmosphere. This results in instantaneous actuation of the brakes connected to the motors.

Upon opening the conduit 102 to the atmosphere, air entering the conduit passes through the electrically controlled valve 104 to the motor 78 back of the piston therein and also through the conduit 118 to the relay valve 120, causing actuation of the relay valve resulting in closing the by-pass 122 and admitting air through the relay valve to the motor 90 back of the piston therein.

Upon the admission of air into the motors 78 and 90, the suction created in the manifold of the engine and distributed through the conduit 70 and the branch conduits 74 and 76 to the motors causes instantaneous actuation of the motors during the initial movement of the clutch pedal lever 50.

As the motors 78 and 90 actuate the brakes they also, by means of rod 46, force casing 56 of valve 54 to the left, thus tending to bring piston 64 back into the same position relative to the casing 56 which it had before the start of the braking operation. Further pressure on the brake pedal 46 will therefore be necessary to keep opening 60 connected with the atmosphere to continue applying the brakes.

As the clutch pedal lever 50 completes its stroke sufficiently to release the clutch, the contactor 116 carried thereby engages the contact 114. The gravity switch 112 having been previously closed due to the inclined position of the tractor on which the switch is mounted, actuation of the clutch pedal lever closes the circuit 108, causing energization of the solenoid 106, resulting in closing of the valve 104 and trapping of air in the conduits between the motor 78 and the relay valve 120 so as to maintain the brakes in applied position.

When the brake pedal 48 is released, the piston 64 will be moved back to its original position, thus opening port 60 to the source of vacuum.

At the conclusion of a braking operation, the operator shifts the transmission of the tractor, as in general practice, and slowly releases the clutch pedal lever 50 so as to engage the clutch. Upon release of the clutch pedal lever, a conventional retractile spring returns the lever to its normal position, and as the lever moves to its normal position the contactor 116 carried thereby disengages the contact 114 and thereby opens the circuit 108. This results in de-energization of the solenoid 106 and opening of the valve 104 so as to establish communication between the manifold 68 of the engine and the motors 78 and 90. The pistons of the motors 78 and 90 are now suspended in vacuum, and under this condition the brakes are moved to the off or retracted position by conventional retractile springs.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is:

1. A braking system for a motor vehicle having a pedal for controlling the operation of said vehicle comprising mechanical means for initially and directly actuating the brakes of a vehicle, power means for continuing the actuation of the brakes, electrically actuated means controlling the power means, a gravity actuated means controlling the electrically actuated means, and a separate control means for the electrically actuated means operated by movement of the pedal.

2. A braking system for a motor vehicle comprising mechanical linkage for initially and directly actuating the brakes of the vehicle, power means for continuing the actuation of the brakes including vacuum actuated motors connected to the power plant of the vehicle and to the mechanical linkage, means for introducing air into the motors, and means for trapping air in the motors including an electrically actuated valve controlled by a gravity switch and a mechanically actuated switch.

3. In a vacuum brake system for automobiles, the combination of brake actuating means, a power cylinder for controlling said means, means comprising a control valve for controlling flow of fluid to said cylinder to apply said brake and from said cylinder to release said brake, a fluid conduit for connecting said last-named means and said cylinder, a valve interposed in said conduit comprising a valve seat, an electrically operated valve element and a solenoid operable to move said valve element to said seat to close the valve to prevent flow of fluid and to hold the brake applied.

4. In a fluid brake system for automobiles, the combination of a fluid pressure operated brake unit, a device for supplying fluid pressure to said unit, means for connecting said device to said unit, a valve comprising an annular valve seat and a valve element interposed in said means between said unit and said device, an electrically actuated valve stem secured to said valve element, and a solenoid operable to force said valve element into engagement with said seat, said valve element having a larger area facing toward said fluid pressure-supplying device than toward the said brake unit.

5. In a brake system for automobiles, the combination of means for directly actuating the brakes, a vacuum operated power cylinder for controlling said means, linkage connecting said cylinder to said means, valve means for controlling flow of fluid to and from said cylinder, a fluid conduit for connecting said valve means and said cylinder, a valve interposed in said conduit comprising a valve seat, an electrically operated valve element, and a solenoid operable to move said valve element to said seat.

6. In a brake system for automobiles, the combination of brake actuating means, a vacuum operated power cylinder for controlling said means, valve means for controlling flow of fluid to and from said cylinder, a fluid conduit for connecting said valve means and said cylinder, a valve interposed in said conduit comprising a valve seat, an electrically operated valve element, and a solenoid operable to move said valve element to said seat to close the valve to prevent flow of fluid and to hold the brake applied.

7. A braking system for a motor vehicle comprising power means for actuating the brakes, electrically actuated means controlling the power means, a gravity switch for controlling the electrically actuated means and a separate switch for controlling the electrically actuated means.

8. A braking system for a motor vehicle comprising mechanical linkage for actuating the brakes of the vehicle, power means for actuating the mechanical linkage, including vacuum actuated motors connected to the power plant of the vehicle and to the mechanical linkage, means for varying the pressure in the said motors, and means for isolating the motors so as to maintain a differential pressure therein, said last-named means including an electrically actuated valve controlled by a gravity switch and a mechanically actuated switch.

RUDOLPH A. GOEPFRICH.